US006934421B2

(12) United States Patent
Gindele et al.

(10) Patent No.: US 6,934,421 B2
(45) Date of Patent: Aug. 23, 2005

(54) CALCULATING NOISE FROM MULTIPLE DIGITAL IMAGES HAVING A COMMON NOISE SOURCE

(75) Inventors: Edward B. Gindele, Rochester, NY (US); Navid Serrano, Rochester, NY (US); Jeffrey C. Snyder, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 510 days.

(21) Appl. No.: 10/102,485

(22) Filed: Mar. 20, 2002

(65) Prior Publication Data

US 2003/0179944 A1 Sep. 25, 2003

(51) Int. Cl.[7] .................................................. G06K 9/40

(52) U.S. Cl. ....................... 382/260; 382/252; 382/274; 382/275; 358/3.26; 358/3.27; 358/463

(58) Field of Search ................................ 382/252, 260, 382/274, 275, 282; 358/3.26, 3.27, 463

(56) References Cited

U.S. PATENT DOCUMENTS

| | | | | |
|---|---|---|---|---|
| 4,682,230 A | | 7/1987 | Perlman et al. | |
| 4,761,819 A | | 8/1988 | Denison et al. | |
| 4,918,633 A | | 4/1990 | Sullivan | |
| 5,081,692 A | | 1/1992 | Kwon et al. | |
| 5,091,972 A | | 2/1992 | Kwon et al. | |
| 5,923,775 A | | 7/1999 | Snyder et al. | |
| 6,173,087 B1 | * | 1/2001 | Kumar et al. | 382/284 |
| 6,493,569 B2 | * | 12/2002 | Foo et al. | 600/410 |
| 6,538,705 B1 | * | 3/2003 | Higurashi et al. | 348/745 |
| 6,614,914 B1 | * | 9/2003 | Rhoads et al. | 382/100 |
| 6,658,149 B1 | * | 12/2003 | Wakahara et al. | 382/215 |

OTHER PUBLICATIONS

J. Portilla, et al, Adaptive wiener denoising using a gaussian scale mixture mode in the wavelet domain, Proceedings 2001 International Conference on Image Processing ICIP2001, IEEE US pp. 37–40.

"Digital Image Smoothing and the Sigma Filter" by Jong–Sen Lee, Computer Vision, Graphics and Image Processing 24, 255–269 (1983).

* cited by examiner

*Primary Examiner*—Bhavesh M. Mehta
*Assistant Examiner*—Yosef Kassa
(74) *Attorney, Agent, or Firm*—Raymond L. Owens

(57) ABSTRACT

A method for estimating a noise characteristic value for a plurality of digital images that are affected by a common noise source includes receiving a plurality of source digital images that are affected by a common noise source, each source digital image including a plurality of pixels; calculating a total number of pixels included in the source digital images; and receiving a predetermined target number of noise estimates to be calculated for the source digital images. The method also includes using the total number of pixels and the predetermined target number of noise estimates to calculate one or more pixel sampling parameters for the source digital images; using the source digital images and the one or more pixel sampling parameters to calculate a predetermined number of noise estimates; and using the noise estimates to calculate a noise characteristic value for the source digital images.

18 Claims, 3 Drawing Sheets

CALCULATING NOISE FROM MULTIPLE DIGITAL IMAGES HAVING A COMMON NOISE SOURCE

FIELD OF INVENTION

The present invention relates to a method for calculating noise from digital images are affected by a common noise source.

BACKGROUND OF THE INVENTION

Some digital image processing applications designed to enhance the appearance of processed digital images take explicit advantage of the noise characteristics associated with the digital images. For example, U.S. Pat. No. 5,923, 775 to Snyder et al. discloses a method of digital image processing which includes a step of estimating the noise characteristics of a digital image and using the estimates of the noise characteristics in conjunction with a noise removal system to reduce the amount of noise in the digital image. The method described by Snyder et al. is designed to work for individual digital images and includes a multiple step process for the noise characteristics estimation procedure. First, the residual signal is formed from the digital image obtained by applying an edge detecting spatial filter to the digital image. This first residual signal is analyzed to form a mask signal, which determines what regions of the digital image are more or less likely to contain image structure content. The next step includes forming a second residual signal using a Laplacian spatial filter and masking the second residual signal in image regions unlikely to contain image structure content defined by the mask signal. The noise magnitude for the digital image is determined by calculating the standard deviation of the masked second residual signal as a function of the pixel values. The last step of the procedure is the application of a noise removal algorithm that makes use of the estimated noise standard deviation values. Snyder et al. use the method disclosed in commonly assigned U.S. Pat. No. 5,091,972 to remove the noise from the digital image.

The method disclosed by Snyder et al. effectively uses a subset of pixels of the digital image for the purposes of improving the accuracy of the noise estimation procedure. It is known in the art that statistical approximation methods can achieve sufficiently accurate results by analyzing a subset of data points taken as a representative sampling of the entire set of data points. This can be done without significantly sacrificing the accuracy of results, as long as enough sample data points are used. The difficulty in achieving accurate noise estimation results while using a subset of data points lies in the method of determining which data points and how many data points to use.

SUMMARY OF THE INVENTION

It is an object of the present invention to provide an improved way of enhancing digital images, which are affected by a common noise source.

This object is achieved by a method for estimating a noise characteristic value for a plurality of digital images that are affected by a common noise source, comprising the steps of:

a) receiving a plurality of source digital images that are affected by a common noise source, each source digital image including a plurality of pixels;

b) calculating a total number of pixels included in the source digital images;

c) receiving a predetermined target number of noise estimates to be calculated for the source digital images;

d) using the total number of pixels and the predetermined target number of noise estimates to calculate one or more pixel sampling parameters for the source digital images;

e) using the source digital images and the one or more pixel sampling parameters to calculate a predetermined number of noise estimates; and f) using the noise estimates to calculate a noise characteristic value for the source digital images.

ADVANTAGES

It is a feature of the present invention to provide a computationally efficient method of estimating the magnitude of noise affecting a set of digital images by taking advantage of sampled statistics. The present invention is particularly advantageous for estimating the noise magnitude for digital images derived from a common image input source such as a photographic film or digital camera. It is also a feature of the present invention to provide a method for using the estimated noise magnitude values to enhance the appearance of the digital images.

DETAILED DESCRIPTION OF THE INVENTION

In the following description, a preferred embodiment of the present invention will be described as a software program. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

Figure 1:
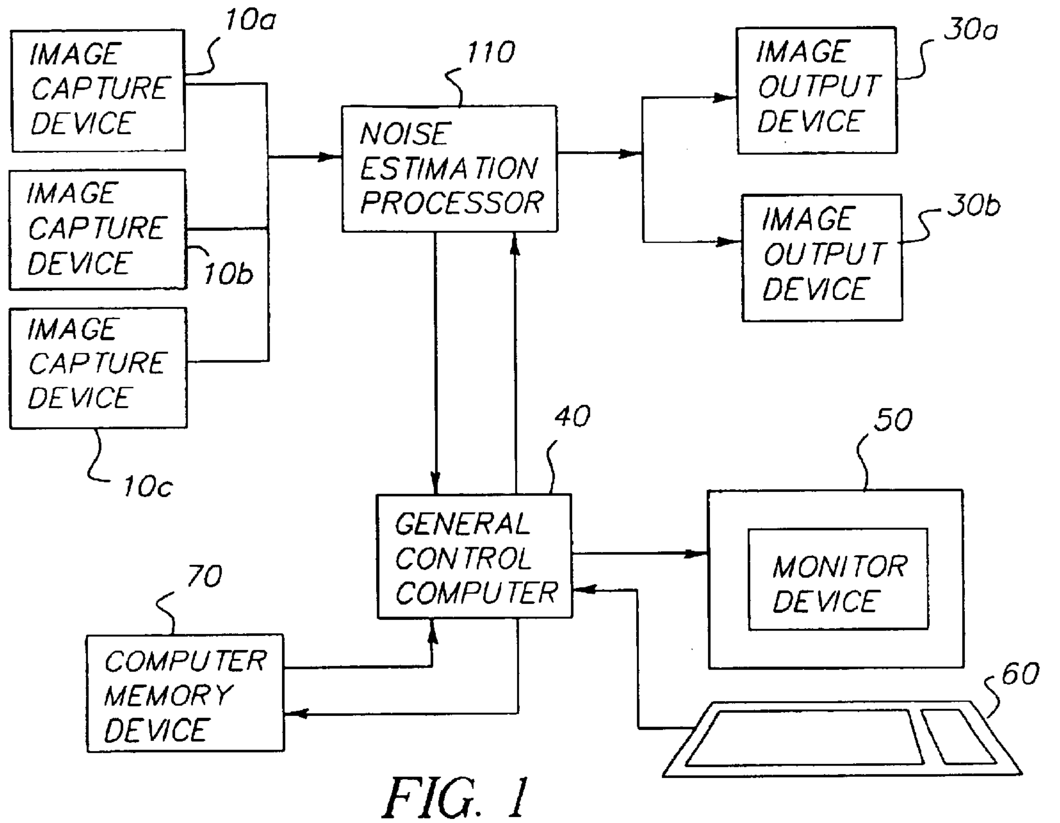
FIG. 1 is a functional block diagram showing the component parts of a digital imaging system implementation of the present invention.

The present invention may be implemented in computer hardware. Referring to FIG. 1, the following description relates to a digital imaging system which includes an image capture device 10*a*, an digital image processor 20, an image output device 30, and a general control computer 40. The system may include a monitor device 50 such as a computer console or paper printer. The system may also include an input control device 60 for an operator such as a keyboard and or mouse pointer. Multiple capture devices 10*a*, 10*b*, and 10*c* are shown illustrating that the present invention may be used for digital images derived from a variety of imaging devices. For example, FIG. 1 may represent a digital photofinishing system where the image capture device 10*a* is a conventional photographic film camera for capturing a scene on color negative or reversal film, and a photographic film scanner for scanning the developed image on the film and producing a digital image. Although the term scanner can refer to digital imaging devices that physically scan or move a sensing element past a photographic film sample, the present invention also includes photographic film scanners and print scanners that employ a stationary image sensing device to generate a digital image. The noise estimation processor 110 receives one or more source digital images 101 from one or more of the image capture devices and calculates a noise characteristic table 105, i.e. a table of noise characteristic values, using the pixel values from the source digital images 101. The table of noise characteristic values can be used for image enhancement purposes by image enhancement methods that utilize a prior knowledge of the noise characteristics of digital images.

The general control computer 40 shown in FIG. 1 can store the present invention as a computer program stored in a computer readable storage medium, which can comprise, for example: magnetic storage media such as a magnetic disk (such as a floppy disk) or magnetic tape; optical storage media such as an optical disc, optical tape, or machine readable bar code; solid state electronic storage devices such as random access memory (RAM), or read only memory (ROM). The associated computer program implementation of the present invention can also be stored on any other physical device or medium employed to store a computer program indicated by offline memory device 70. Before describing the present invention, it facilitates understanding to note that the present invention is preferably utilized on any well known computer system, such as a personal computer.

It should also be noted that the present invention implemented in a combination of software and/or hardware is not limited to devices, which are physically connected and/or located within the same physical location. One or more of the devices illustrated in FIG. 1 may be located remotely and may be connected via a wireless connection.

The present invention can be practiced with digital images expressed in different forms. For example, a digital image can be comprised of one or more digital image channels. Each digital image channel can be comprised of a two-dimensional array of pixels. Each pixel value relates to the amount of light received by an image capture device corresponding to the geometrical domain of the pixel. For color imaging applications a digital image will typically consist of red, green, and blue digital image channels. Other configurations are also practiced, e.g. cyan, magenta, and yellow digital image channels. For monochrome applications, the digital image consists of one digital image channel. Motion imaging applications can be thought of as a time sequence of digital images. Those skilled in the art will recognize that the present invention can be applied to, but is not limited to, a digital image channel for any of the above mentioned applications. Although the present invention describes a digital image channel as a two-dimensional array of pixel values arranged by rows and columns, those skilled in the art will recognize that the present invention can be applied to mosaic (non-rectilinear) arrays with equal effect.

Figure 2:
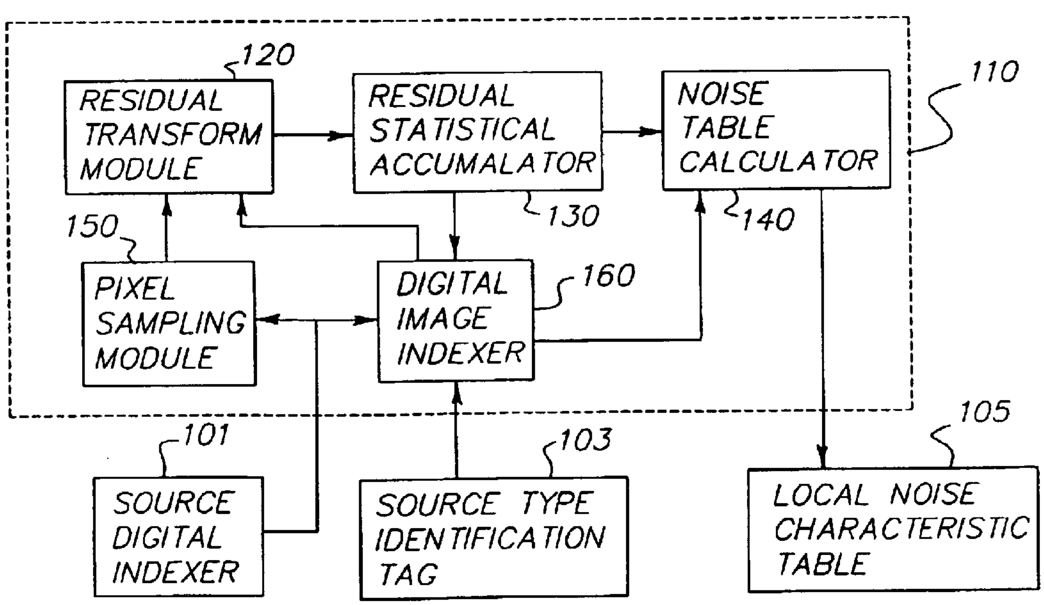
FIG. 2 is a functional block diagram of the noise estimation processor shown in FIG. 1 employed by a preferred embodiment of the present invention.

The noise estimation processor 110 shown in FIG. 1 is illustrated in more detail in FIG. 2. The noise estimation processor 110 receives one or more source digital images 101 that are affected by a common noise source, analyzes the pixel data of the source digital images, and produces one or more noise characteristic values in the form of a noise characteristic table. The noise characteristic values are an estimation of the noise magnitude relating to the common noise source affecting the source digital images.

In general, for statistical processes more accurate results are achieved as the number of statistical samples used in the calculations is increased. However, for realizable digital imaging applications there is a compromise between the desired accuracy of results and the computational resources required to achieve a given accuracy of results. The present invention uses a subset of pixels, i.e. fewer than the maximum number of possible samples, from the source digital images 101 to calculate the noise characteristic values. An important feature of the present invention is the method employed of determining which pixels and how many pixels will contribute to the noise estimation process and still yield acceptably accurate results. Another important feature of the present invention is the use of noise estimation samples from multiple digital images to increase the accuracy of results.

The pixel sampling module 150 receives the source digital images 101 and calculates one or more pixel sampling parameters that in turn determine the method of spatial sampling of pixels for the residual transform module 120. For the purposes of the present invention, the term spatial sampling refers to the process of selecting a subset of pixels from the source digital images 101 that will contribute to the noise estimation process.

The source digital images 101 are received by the digital image indexer 160, which dispatches each source digital image 101 to the residual transform module 120 for processing. The residual transform module 120 receives the source digital images 101 and calculates a noise characteristic table 105, i.e. a table of noise characteristic values, using the pixel values from the source digital images 101. The residual transform module 120 receives a source digital image 101, performs a spatial filtering operation on the pixel data of the source digital image 101 resulting in a residual digital image. The residual digital image produced for each source digital image 101 is received by the residual statistical accumulator 130, which calculates a set of residual histograms used to store intermediate statistical calculations. When the digital image indexer 160 has dispatched all of the source digital images 101, the digital image indexer 160 sends a message to the noise table calculator 140 that all of the source digital images 101 have been processed. The noise table calculator 140 receives the set of residual histograms and produces the noise characteristic table 105.

The pixel sampling module 150 shown in FIG. 2 determines from the source digital images 101 the total number of pixels $N_t$ included in all the digital images. The total number of samples $N_s$ required for sufficiently accurate noise estimation results is a predetermined number and must be determined for the digital image application. Test-target digital images, which include flat patch regions, are used to measure the noise characteristics for digital images produced with a specific image capture device. Next, a set of test digital images is used with a prototype system implementation of the present invention as described hereinbelow. The prototype system implementation is exercises using different values for $N_s$. The measured noise characteristics derived from the test digital images are then compared with the computed noise characteristic values derived from the test-target digital images. A value of $N_s$ is selected based on the accuracy requirements of the digital imaging application. In addition, the present invention calculates noise characteristic values as a function of the numerical pixel values to account for the signal dependent nature of many noise sources. As described hereinbelow, the present invention divides the range of possible pixel values into sub-range intervals. The number of sub-range intervals is represented by the variable $N_i$. Each calculated noise estimate is assigned to one of the sub-range intervals on the basis of the value of corresponding pixel of interest. Thus, the number of samples $N_s$ required for sufficiently accurate noise estimation results relates to each sub-range interval since a noise characteristic value is calculated for each sub-range interval. A predetermined target number of noise estimates to be calculated for the source digital images, i.e. the collective number of noise estimates for all the sub-range intervals, is given by $N_s$ multiplied by $N_i$. If only one sub-interval is specified, then the predetermined target number of noise estimates is given by $N_s$.

The preferred embodiment of the present invention uses a uniform spatial sampling method for selecting pixels that will contribute to the noise estimation process. Two pixel sampling parameters are calculated, i.e. one parameter for each of two orthogonal spatial orientations. For digital imaging systems which use digital images with a rectilinear arrangement of rows and columns of pixels, a row pixel sampling parameter $R_s$ and a column pixel sampling parameter $C_s$ are calculated as given by (1)

$$R_s=C_s=\sqrt{N_t/(N_sN_i)} \quad (1)$$

Figure 3:
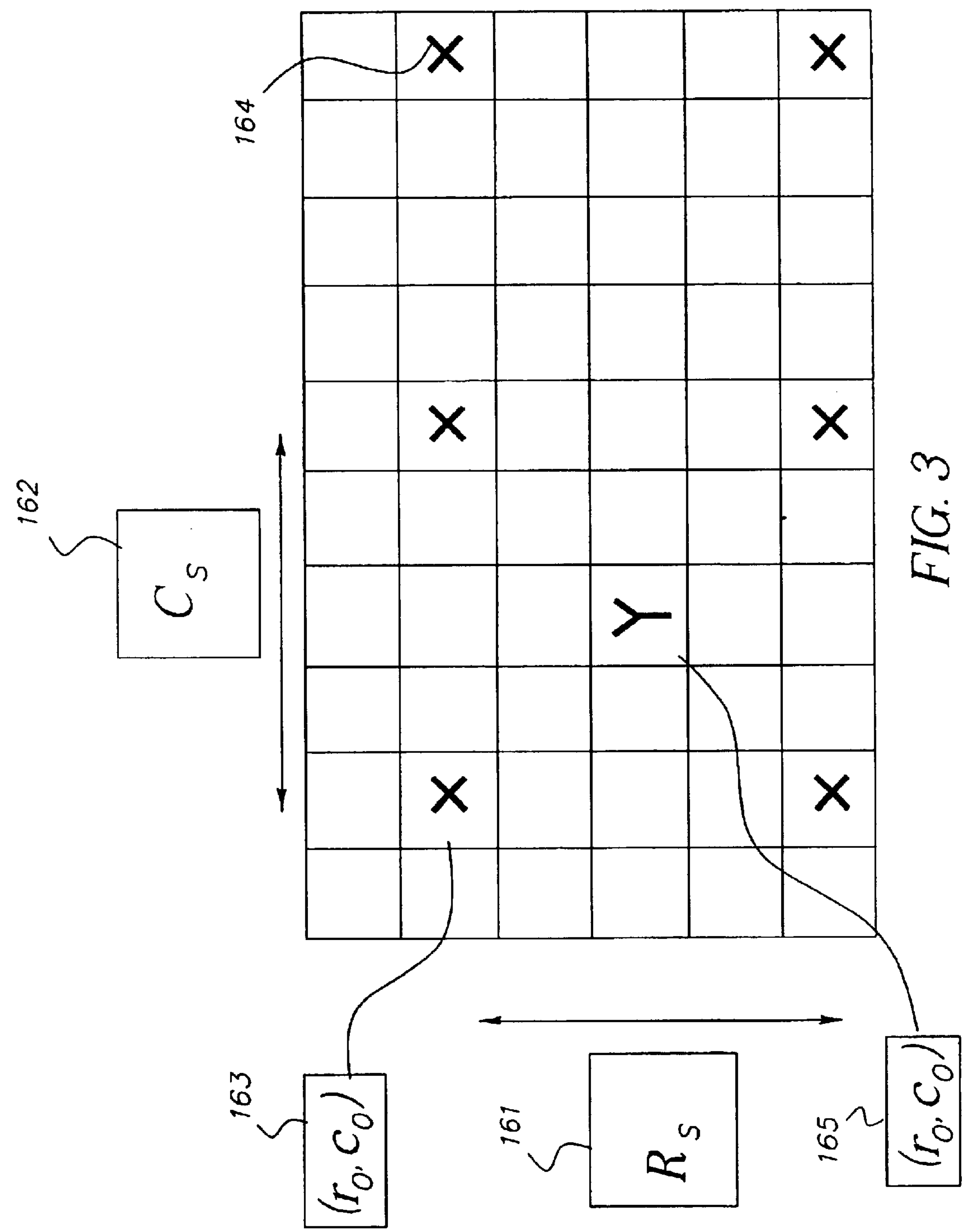
FIG. 3 shows the geometry of selected pixels of interest.

For example, with the experimental procedure as described above, it was found that roughly 3,000 noise estimates were required to yield acceptably accurate results for a set of 25 source digital images wherein the average digital image included 1,500,000 pixels. The value of $N_t$ for this set of source digital images is 37,500,000, the number of sub-range intervals $N_r$ was set to 16, and the value of $N_s$ is 3,000. Using equation (1) the value calculated for $R_s$ and $C_s$ is 27. For this digital imaging application, a noise sample is generated for every $27^{th}$ pixel of every $27^{th}$ row of each of the source digital images 101. The uniform sampling method described above is best from the perspective of evenly sampling the image content of the source digital images 101. Since the samples are evenly spaced in the row and column directions, there are no large areas of image content that can escape being sampled. FIG. 3 shows an example of the geometry of selected pixels of interest 164 indicated with an "X" for a case where $R_s=C_s=4$. The row pixel sampling parameter $R_s$ is indicated by block 161, and the column pixel sampling parameter $C_s$ is indicated by block 162. It should be noted that while the present invention used a different pixel sampling parameter for each spatial direction, the same pixel sampling parameter can be used for both directions.

An alternative embodiment of the present invention uses an asymmetric relationship for the calculation of the pixel sampling parameters $R_s$ and $C_s$, wherein the two pixel sampling parameters have different values. This alternative embodiment can still yield acceptably accurate results and has the advantage of being computationally faster for some computer architectures. The computational speed advantage is mainly due to the relative speed difference between 1) calculating the noise estimates from the pixel data, and 2) fetching pixel data from computer memory. For this embodiment, the $R_s$ pixel sampling parameter is set to 1.0. The value of Cs is determined by (2)

$$C_s=N_t/(N_sN_1) \quad (2)$$

Figure 4:
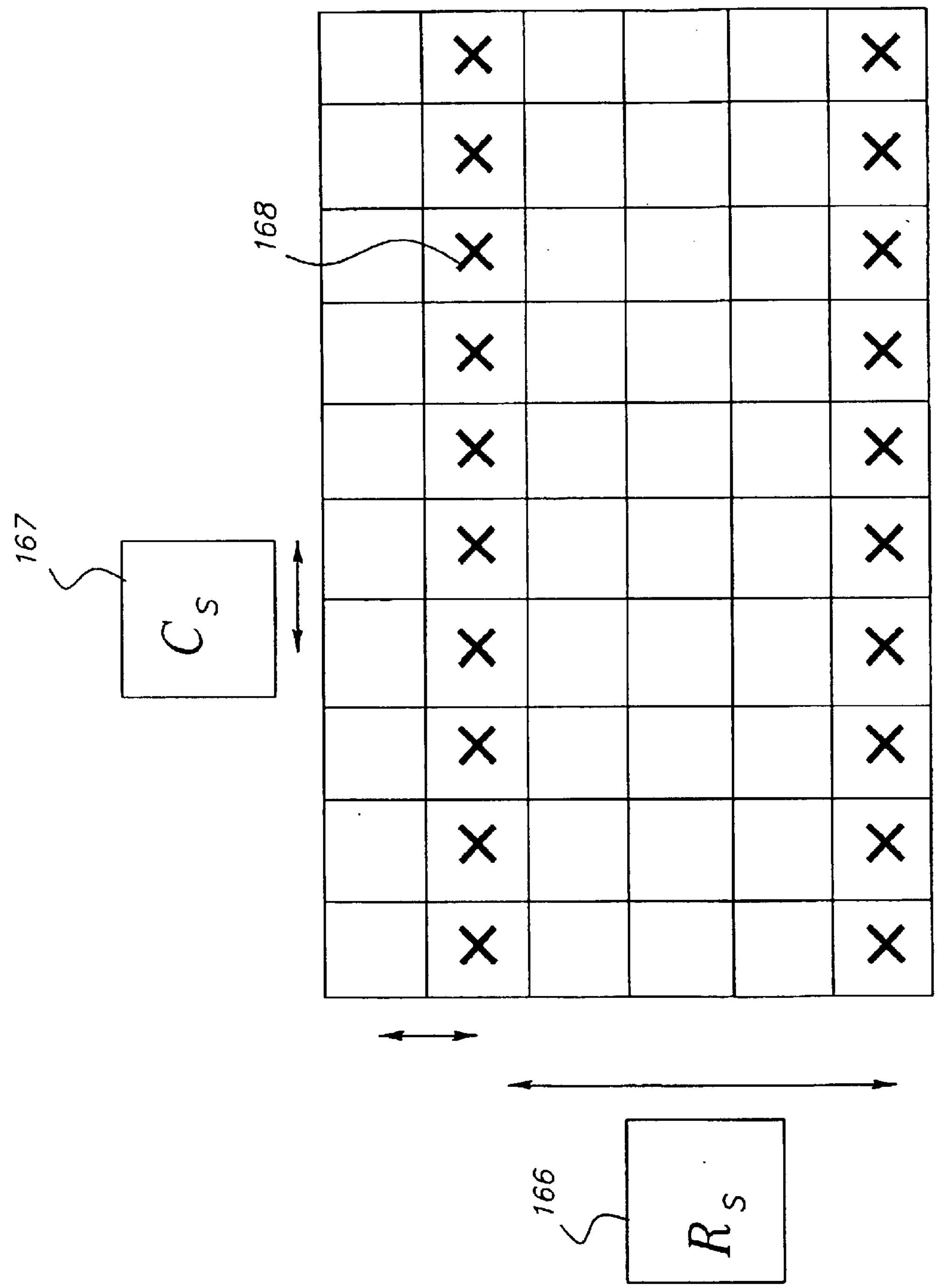
FIG. 4 shows the geometry of selected pixels of interest for an alternative embodiment.

The total number of samples $N_s$ required for sufficiently accurate noise estimation results must be greater for this embodiment than the requirement of $N_s$ for the preferred embodiment. This is mainly due to the need to ensure that no large areas within the source digital images 101 are missed by the sampling method. For the example digital imaging application given above, the value of $N_s$ must be approximately 25,000. The number calculated for $C_s$ is 94. For this embodiment, a noise estimate sample is generated for every pixel of every $94^{th}$ row of each of the source digital images 101. FIG. 4 shows an example of the geometry of selected pixels of interest 168 indicated with an "X" for a case where $R_s=1$ and $C_s=4$. The row pixel sampling parameter $R_s$ is indicated by block 166, and the column pixel sampling parameter $C_s$ is indicated by block 167.

It is important to note that the present invention can be used with individual source digital images 101 or with multiple source digital images 101. For the case of multiple source digital images 101, there is no requirement that the individual source digital images 101 all have the same number of pixels. Nor is it a requirement of the present invention that the all the source digital images 101 have the number of rows of pixels or number of columns of pixels. The present invention relies principally on the total number of pixels $N_t$ associated with the source digital images 101 and the number of samples $N_s$ required per sub-range interval required for accurate noise estimation results.

The residual transform module 120 receives the pixel sampling parameters from the pixel sampling module 150 and uses these parameters to determine the spatial location of pixels to be processed. For each source digital image 101 the process starts with the identification of a first pixel of interest given by the starting pixel coordinates denoted by $(r_o,c_o)$ for the row and column index respectively. Since the spatial filter used to calculate noise estimates requires a local neighborhood of pixel values, the values of $r_o$ and $c_o$ correspond to the first row and column of image pixel data for which a full neighborhood of pixels is available. The residual transform module 120 selects pixels of interest based on the pixel sampling parameters $R_s$ and $C_s$. The next pixels of interest to be selected are given by the pixel coordinate $(r_o, c_o+C_s)$, $(r_o, c_o+2\ C_s)$, $(r_o, c_o+3\ C_s)$ and so on until the end of the column of pixel data is reached. Then the next pixels of interest to be selected are given by the pixel coordinates $(r_o+R_s, c_o)$, $(r_o+R_s, c_o+C_s)$, $(r_o+R_s, c_o+2\ C_s)$, $(r_o+R_s, c_o+3\ C_s)$ and so on until the end of the column of pixel data is reached. FIG. 3 shows an example of the geometry of the starting pixel coordinates $(r_o,c_o)$ indicated by block 163.

Referring to FIG. 2, the residual transform module 120 uses a residual spatial filter to perform a spatial filtering operation on the pixel data of a digital image. A residual pixel value is generated for each original pixel value in the source digital image 101 by the residual spatial filter. For each pixel of interest a residual pixel value is calculated using a combination of pixel values sampled from a local region of pixels from the source digital image. If the source digital image 101 is a color digital image, the residual transform module 120 performs the spatial filtering operation on each color digital image channel and forms a residual pixel value for each pixel of each color digital image channel. The preferred embodiment of the present invention uses a two-dimensional Laplacian operator as the spatial filter to form the residual pixel values. The Laplacian operator calculates a local arithmetic mean value from the value of pixel sampled from the local region of pixels about the pixel of interest and subtracts the value of the pixel of interest from the local arithmetic mean value. A local region of 3 by 3 pixels is used. Although the preferred embodiment of the present invention uses a two-dimensional Laplacian based residual spatial filter, those skilled in the art will recognize that the present invention can be practiced with other spatial filters, such as but not limited to, one-dimensional Laplacian spatial filters.

An alternative embodiment of the present invention uses the method disclosed by Snyder et al. in U.S. Pat. No. 5,923,775. The method described by Snyder et al. is designed to work for individual digital images. The present inventions extends the method of Snyder et al. by combining the statistics generated from multiple digital images. This alternative embodiment includes a multiple step process for the noise characteristics estimation procedure. A first residual digital image is formed for each source digital image obtained by applying an edge detecting spatial filter to each source digital images. The statistics from these first residual digital images are analyzed resulting in the calculation of a threshold value. This threshold value is then used to form a mask digital image for each source digital image which determines what regions of the digital image are more and less likely to contain image structure content. The next step includes forming a second residual digital image using a Laplacian spatial filter and masking the second residual digital image in image regions unlikely to contain image structure content to defined by the mask digital image. In this embodiment of the present invention, on the first and second residual images are calculated for the selected pixels of interest using the same spatial sampling method as described above. The set of residual histograms are generated using the residual statistical accumulator 130.

The pixel data of the source digital image 101 can be conceptualized as having two components—a signal component relating to photographed objects and a noise component. The resulting residual pixel values have statistical properties that have a closer relationship to the noise component of the pixel data of the source digital image 101 than the signal component and therefore can be considered as noise estimates. Although the noise component can contain sub-components, the stochastic sub-component of the noise component is well modeled by a zero mean Gaussian probability distribution function. To first order, the noise component of the pixel data of the source digital image 101 can be characterized by a standard deviation and a mean value of zero. To second order, standard deviation of the noise component can be modeled as being signal and color channel dependent.

The residual statistical accumulator 130 analyzes the residual pixel values and records these values in the form of a set of residual histograms as a function of the pixel color and numerical pixel value. Therefore a given residual histogram $H_{ik}$ relates to the $i^{th}$ color digital image channel and the $k^{th}$ pixel value sub-range. For each pixel of interest denoted by $p_{mn}$ (corresponding to the $m^{th}$ row and $n^{th}$ column location) in the processed color digital image channel, a histogram bin index k is computed. For example, if the numerical range of pixel values is from 0 to 255 there can be as many as 256 useful histograms, i.e. one histogram for each possible numerical pixel value. In general, most noise sources can be characterized as having noise standard deviations that are slow functions of the pixel value. Therefore, the preferred embodiment of the present invention uses 8 histograms, (the number of sub-range intervals $N_i$ is equal to 8) to cover the numerical pixel value range from 0 to 255. Thus the calculated histogram index bin and the corresponding sub-range pixel values are given by the following Table (1).

TABLE 1

| histogram bin index | sub-range pixel values | average pixel value |
|---|---|---|
| 0 | 0 to 31 | 16 |
| 1 | 32 to 63 | 48 |
| 2 | 64 to 95 | 80 |
| 3 | 96 to 127 | 112 |
| 4 | 128 to 159 | 144 |
| 5 | 160 to 191 | 176 |
| 6 | 192 to 233 | 208 |
| 7 | 234 to 255 | 240 |

Those skilled in the art will recognize that the present invention can be practiced with digital image pixel data with any numerical range. The number of residual histograms used for each color digital image channel will depend on the accuracy of results required for the particular digital imaging application.

Although each residual histogram records statistical information for a range of pixel values for a given color digital image channel, the residual histogram records the frequency of residual pixel values associated with each pixel of interest $p_{mn}$. Since the expected mean of the distribution of residual pixel values is zero, the residual pixel values exhibit both positive and negative values. Therefore, the residual histogram must record the frequency, i.e. the number of instances of residual pixel values, of all possible instances of residual pixel values. For the example above, the residual pixel values can range from −255 to +255. While it is possible to construct residual histograms with as many recording bins as there are possible instances of residual pixel values, in general it is not necessary. For most digital images only a small percentage of residual pixel values exhibit values near the extremes of the possible range. The present invention uses 101 total recording bins for each residual histogram. One of the recording bins corresponds to residual pixel values of 50 and greater. Similarly, one other recording bin corresponds to residual pixel values of −50 and lower. The other 99 recording bins each correspond to a single residual pixel value for the numerical range from −49 to +49.

Referring to FIG. 2 the noise table calculator 140 receives a set of residual histograms and calculates the noise characteristic table 105 in the form of a table of standard deviation values. For each of the residual histograms relating to a particular color digital image channel and pixel value range, the noise table calculator 140 derives a noise standard deviation value from the value of the recording cells of the residual histogram. The preferred embodiment of the present invention uses equation (3) to calculate the standard deviation value $\sigma_n$ $$\sigma_n = \left((1/N)\sum_k RC_v(k)(x - x_m)^2\right)^{1/2} \quad (3)$$

where the variable x represents the average pixel value of the residual pixel values accumulated in the $k^{th}$ recording cell as given by Table (1) and RCv(k) represents the number of residual pixel values accumulated by the $k^{th}$ recording cell.

$$x = V(k) \quad (4)$$

The variable $x_m$ represents the arithmetic mean value of the corresponding residual pixel values given by equation (3), $$x_m = (1/N)\sum_k x \quad (5)$$

and the variable N represents the total number of residual pixel values recorded by the updated residual histogram given by equation (6).

$$N = \sum_k RC_v(k) \quad (6)$$

An alternative embodiment of the present invention performs an alpha-trimmed standard deviation calculation. In this embodiment a first approximation to the standard deviation $\sigma_e$ is calculated using the method described above. The calculation of $\sigma_n$ is then calculated using the only recording cells with corresponding residual pixel values that are within a limited range of zero. The formula for the standard deviation calculation $\sigma_n$ is given by equation (7)

$$\sigma_n = \left( (1/N) \sum_k \gamma RC_v(k)(x - x_m)^2 \right)^{1/2} \quad (7)$$

where the variable $\gamma$ is given by equation (8)

$$\gamma=1 \text{ if } |x|<\alpha\sigma_e \quad (8)$$

$$\gamma=0 \text{ if } |x|>=\alpha\sigma_e$$

where the variable $\alpha$ is set to 3.0. This alternative embodiment of the present invention is more computationally intensive than the preferred embodiment, but does yield more accurate results via the rejection of outlying residual pixel values from adversely contributing to the calculation of the standard deviation $\sigma_n$ value.

Table 2 below is an example of a noise characteristic table produced with the present invention.

TABLE 2

| average pixel value | Standard deviation of red channel | Standard deviation of green channel | Standard deviation of blue channel |
|---|---|---|---|
| 16 | 1.739 | 1.815 | 2.449 |
| 48 | 1.733 | 1.808 | 1.575 |
| 80 | 1.441 | 1.508 | 1.582 |
| 112 | 1.558 | 1.552 | 1.704 |
| 144 | 1.651 | 2.038 | 2.063 |
| 176 | 0.867 | 0.975 | 2.818 |
| 208 | 0.840 | 0.855 | 0.991 |
| 240 | 1.482 | 1.955 | 0.739 |

Those skilled in the art should recognize that the present invention can be practiced with calculated quantities other than the standard deviation that relate to the noise present in digital images. For example, the statistical variance (a squared function of the standard deviation) or statistical median can also be derived from the residual histograms and be used to form a table of noise characteristic values.

Experimentation with digital images of different spatial resolution revealed that the optimum value for the total number of samples $N_s$ parameter described above depended on the average number of pixels per digital image, i.e. the spatial resolution of the digital images. It was determined that digital images of lower spatial resolution require more noise estimate samples than do digital images of higher spatial resolution. This is due to the fact that as the spatial resolution of digital images increases, the nearest neighbor pixel modulations are more attributable to noise content. Conversely, as the spatial resolution of digital images decrease, the nearest neighbor pixel modulations are more attributable to signal content. Virtually all spatial filters produce residual digital images with some signal content contamination, i.e. the residual digital image does not contain only noise content. The Laplacian filter described above produces residual digital images with more contamination of signal content that does the spatial filtering method of disclosed by Snyder et al. in U.S. Pat. No. 5,923,775. Therefore the spatial filtering method of disclosed by Snyder et al. works better for digital images of low spatial resolution. However, the method disclosed by Snyder et al. also requires more samples to be calculated since many of the samples are rejected by the masking process.

The present invention uses different predetermined $N_s$ parameters for sets of source digital images 101 of different average spatial resolutions. An average number of pixels $N_a$ is calculated for the source digital images 101 by dividing the total number of pixels $N_t$ by the number of sources digital images. For each set of source digital images 101 the $N_a$ parameter is used to determine the $N_s$ parameter and consequently the pixel sampling parameters. A table of $N_s$ parameters is predetermined for a given digital imaging application relating to different ranges of $N_a$ values. The $N_s$ parameter is selected based on the table entry that has the closest associated $N_a$ value for the calculated $N_a$ parameter. Thus the target number of noise estimates is selected on the basis of the calculated average number of pixels per image for the source digital images.

If the pixel values of the source digital images 101 are even distributed throughout the sub-range intervals, the above calculation of the target number of noise estimates will be valid for each of the sub-range intervals. However, many digital images do not have their pixel values evenly distributed. Consequently, some of the sub-range intervals residual histograms can record fewer than $N_s$ samples.

An alternative embodiment of the present invention uses a second pass of calculations to improve the statistical accuracy of results. After the first pass of calculations is performed, each of the residual histograms is evaluated to determine if any have recorded less than $N_s/2$ samples indicating a condition requiring additional samples. The set of source digital images 101 is reprocessed to collect more noise estimates. The first pixel of interest is selected by the starting pixel coordinates denoted by $(r_o+R_s/2,\ c_o+C_s/2)$ for the row and column indices respectively. FIG. 3 shows an example of the geometry of the starting pixel coordinates selected for the second pass procedure as indicated by block 165. Parameter $C_s$ is indicated by block 162. This ensures that different pixels will be spatially sampled during the second pass of calculations. In similar fashion as described above, subsequent pixels of interest are selected based on the pixel sampling parameters $R_s$ and $C_s$. However, additional noise estimates are calculated only for sub-range intervals for which less than $N_s/2$ samples were recorded during the first pass of calculations. Thus, during the second pass of calculations some pixels of interest are discarded resulting in reduced the computational costs.

An important feature of the present invention is combining the residual statistics of derived from multiple digital images. With more pixel data considered from multiple digital images, the standard deviation values of the calculated noise characteristic table converge to the true inherent noise characteristics of the digital images. For many digital imaging applications, a plurality of digital images derived from a common image source will be affected by a common noise source.

The above discussion has included details of practicing the present invention for digital images of general type. However, most digital imaging systems accept digital images from a variety of sources. For example, the image capture devices 10*a* and 10*b* shown in FIG. 1 could be a photographic film scanner while the image capture device 10*c* could be a digital camera, a digital camcorder, or a print scanner. The image capture device can contribute noise to the digital images it produces. However, the inherent noise in the capture medium usually dominates the overall noise characteristics of the resultant digital images. For example, while a photographic film scanner can produce digital images from any photographic film type, in general, some photographic films are inherently noisier that others. A photographic film sample is an example of a photographic image. Other examples of photographic images can include, but are not limited to, a CCD imaging electronic device and a photographic print.

In an alternative embodiment of the present invention, the image capture devices 10*a*, 10*b*, and 10*c* shown in FIG. 1 are capable of producing a source type identification tag 103, as shown in FIG. 2, which uniquely identifies a source digital image or set of source digital images as being of a particular type or belonging to a particular consumer. In the example given above, a photographic film sample Kodak Generation 6 Gold 200 film is scanned by the image capture device 10*a* which produces a set of source digital images 101 and a source type identification tag 103. The digital imaging system maintains a plurality of stored source type identification tags, which correspond to a plurality of stored sets of residual histograms. Each stored set of residual histograms corresponds to a different type of photographic film, print scanner, and or digital camera. The digital imaging system uses the source type identification tag to select the appropriate stored set of residual histograms. Referring to FIG. 2, the source type identification tag 103 is received by the digital image indexer 160 of the noise estimation processor 110 shown in FIG. 2. The source type identification tag 103 identifies the source digital images 101 as being Kodak Generation 6 Gold 200 film. Therefore, in this embodiment of the present invention the residual statistical accumulator 130 updates the set of residual histograms with data based the type of imaging device that produced the source digital images. Consequently, the noise table calculator 140 produces noise characteristic tables that specifically relate to the of imaging device that produced the source digital images. The digital imaging system stores a data base of noise characteristic tables corresponding to the different source type identification tags 103.

Those skilled in the art will recognized that this feature of the present invention can easily be extended to include other sources of digital images. For example, the image capture device 10*c* can be a digital still camera, such as the Kodak DC 290. For this example, the image capture device 10*c* produces a unique source type identification tag 103. In this manner, any newly produced digital camera which produces a new and unique source type identification tag can be processed effectively with the present invention. When the digital imaging systems shown in FIG. 1 encounters a previously unknown source type identification tag 103, a new set of residual histograms and noise characteristic table are created.

The calculated noise characteristic table can be used in conjunction with other digital image processing transforms such as spatial filters to produce to enhance the source digital images. A spatial filter is any method which uses pixel values sampled from a local region about a pixel of interest to calculate an enhanced pixel value, which replaces the pixel of interest. Those spatial filters, which reduce spatial modulation, for at least some pixels in an effort to remove noise from the processed digital image, can be considered noise reduction filters. Those spatial filters, which increase spatial modulation, for at least some pixels in an effort to enhance spatial detail noise in the processed digital image, can be considered spatial sharpening filters. It should be noted that it is possible for a single spatial filter to be considered both a noise reduction filter as well as a spatial sharpening filter. The present invention can be used with any digital image processing method, which makes uses of a noise characteristic table to produce an enhanced digital image. Spatial filters that adjust a processing control parameter as a function of either the color or numerical value of pixels are adaptive spatial filters. The present invention uses a noise reduction filter and a spatial sharpening filter which are responsive to a noise characteristic table and thus use the noise characteristic values to control the behavior of a spatial filter to enhance the appearance one or more of the source digital images.

The present invention uses a modified implementation of the Sigma filter, described by Jong-Sen Lee in the journal article *Digital Image Smoothing and the Sigma Filter*, Computer Vision, Graphics, and Image Processing Vol 24, p. 255–269, 1983, as a noise reduction filter to enhance the appearance of the source digital images 101. The values of the pixels contained in a sampled local region, n by n pixels where n denotes the length of pixels in either the row or column direction, are compared with the value of the center pixel, or pixel of interest. Each pixel in the sampled local region is given a weighting factor of one or zero based on the absolute difference between the value of the pixel of interest and the local region pixel value. If the absolute value of the pixel value difference is less or equal to a threshold $\epsilon$, the weighting factor if set to one. Otherwise, the weighting factor is set to zero. The numerical constant $\epsilon$ is set to two times the expected noise standard deviation. Mathematically the expression for the calculation of the noise reduced pixel value is given as $$q_{mn} = \sum_{ij} a_{ij} p_{ij} \Big/ \sum_{ij} a_{ij} \tag{9}$$

and $$a_{ij}=1 \text{ if } |p_{ij}-p_{mn}|<=\epsilon$$

$$a_{ij}=0 \text{ if } |p_{ij}-p_{mn}|>\epsilon$$

where $p_{ij}$ represents the $ij^{th}$ pixel contained in the sampled local region, $p_{mn}$ represents the value of the pixel of interest located at row m and column n, $a_{ij}$ represents a weighting factor, and $q_{mn}$ represents the noise reduced pixel value. Typically, a rectangular sampling region centered about the center pixel is used with the indices i and j varied to sample the local pixel values.

The signal dependent noise feature is incorporated into the expression for $\epsilon$ given by equation (10)

$$\epsilon=Sfac\sigma_n(p_{mn}) \tag{10}$$

where $\sigma_n$ represents the noise standard deviation of the source digital image 101 evaluated at the center pixel value $p_{mn}$ as described by equations (3) and (8) above. The parameter Sfac is termed a scale factor can be used to vary the degree of noise reduction. The optimal value for the Sfac parameter has been found to be 1.5 through experimentation however values ranging from 1.0 to 3.0 can also produce acceptable results. The calculation of the noise reduced pixel value $q_{mn}$ as the division of the two sums is then calculated. The process is completed for some or all of the pixels contained in the digital image channel and for some or all the digital image channels contained in the digital image. The noise reduced pixel values constitute the noise reduced digital image. The modified implementation of the Sigma filter is an example of a noise reduction filter that uses a noise characteristic table and is therefore an adaptive noise reduction filter which varies the amount of noise removed as a function of the pixel color and numerical value.

Although the present invention can be used with any spatial sharpening filter, which utilizes a priori knowledge of the noise characteristics, the present invention uses a modified implementation of the method described by Kwon et al. in U.S. Pat. No. 5,081,692. This spatial sharpening method performs an unship masking operation by filtering the input digital image with a spatial averaging two-dimensional Gaussian filter (characterized by a standard deviation of 2.0 pixels) which results in a blurred digital image. The blurred digital image is subtracted from the input digital image to form a high-pass residual. In the method disclosed by Kwon et al., a local variance about a pixel of interest is calculated by using the pixel data from the high-pass residual. Based on the value of the local variance a sharpening factor is adjusted so as to amplify large signals more than small amplitude signals. The amplification factor $\phi$ is therefore a factor of the local variance v. i.e. $\phi(v)$.

The present invention modifies the method taught by Kwon et al. to make the amplification factor $\phi(\nu)$ a function of the estimated noise, i.e. $\phi(\nu,\sigma_n)$. The amplification function f is given by a gamma function, or integral of a Gaussian probability function, as given by equation (11).

$$\phi(v) = \frac{y_o + y_{\max}\sum e^{-(v-v_o)^2/2s^2}}{y_o + y_{\max}\sum e^{-(v_{\max}-v_o)^2/2s^2}} \qquad (11)$$

where $y_O$ represents a minimum amplification factor $Y_{max}$ represents a maximum amplification factor, $\nu_{max}$ represents a maximum abscissa value of the variable $\nu$, $\nu_o$ represents a transition parameter and s represents a transition rate parameter. The variable $\nu_o$ is a function of the noise standard deviation value $\sigma_n$ as per equation (12)

$$\nu_o = Sfac_2\sigma_n(p_{mn}) \qquad (12)$$

where the scaling factor $Sfac_2$ determines the sensitivity of the sharpening sensitivity to the noise and the noise standard deviation value $\sigma_n$ is as described above in equations (3) and (8). The optimal values for the variables used in equation (12) depend on the digital imaging application. The present invention uses a value of 1.0 for $y_O$, which results in no spatial sharpening for noisy regions. A value of 3.0 is used for $y_{max}$, however, this variable is sensitive to user preference with values ranging from 2.0 to 4.0 producing acceptable results. The value of $Sfac_2$ should be set to between 1.0 and 2.0 with 1.5 as optimal. The variables should be set to values in the range from vo/2 to vo/10 for reasonable results. The variable $\nu_{max}$ should be set to a value much larger than the expected noise, e.g. 20 time the value of $\sigma_n$.

The invention has been described in detail with particular reference to certain preferred embodiments thereof, but it will be understood that variations and modifications can be effected within the spirit and scope of the invention.

PARTS LIST

10*a* image capture device
10*b* image capture device
10*c* image capture device
20 digital image processor
30*a* image output device
30*b* image output device
40 general control computer
50 monitor device
60 input control device
70 offline memory device
101 source digital image
103 source type identification tag
105 local noise characteristic table
110 noise estimation processor
120 residual transform module
130 residual statistic accumulator
140 noise table calculator
150 pixel sampling module
160 digital image indexer
161 row pixel sampling parameter
162 column pixel sampling parameter
163 starting pixel coordinates
164 pixel of interest
165 starting pixel coordinates
166 row pixel sampling parameter
167 column pixel sampling parameter
168 pixel of interest

What is claimed is:

1. A method for estimating a noise characteristic value for a plurality of digital images that are affected by a common noise source, comprising the steps of:

a) receiving a plurality of source digital images that are affected by a common noise source, each source digital image including a plurality of pixels;

b) calculating a total number of pixels included in the source digital images;

c) receiving a predetermined target number of noise estimates to be calculated for the source digital images;

d) using the total number of pixels and the predetermined target number of noise estimates to calculate one or more pixel sampling parameters for the source digital images;

e) using the source digital images and the one or more pixel sampling parameters to calculate a predetermined number of noise estimates; and f) using the noise estimates to calculate a noise characteristic value for the source digital images.

2. The method of claim 1 further including the steps of:

i) receiving the plurality of predetermined target number of noise estimates wherein each predetermined target number of noise estimates relates to a different average number of pixels per image;

ii) calculating an average number of pixels per image for the source digital images; and iii) selecting one of the plurality of predetermined target number of noise estimates using the calculated average number of pixels per image for the source digital images.

3. The method of claim 1 wherein the one or more pixel sampling parameter is used to select pixels of interest for calculating the noise estimates uniformly throughout the source digital images.

4. The method of claim 1 wherein two pixel sampling parameters are calculated for the source digital images, the two pixel sampling parameters relating to different spatial orientations.

5. The method of claim 4 wherein the two pixel sampling parameters have different values.

6. The method of claim 1 wherein step d) includes calculating the noise characteristic values as a function of the numerical pixel values.

7. The method of claim 6 wherein step d) further includes the steps of:

i) assigning each noise estimate to one of a plurality of numerical sub-range intervals relating to different numerical ranges of pixel values;

ii) receiving a predetermined sub-interval target number of noise estimates; and iii) after having calculated the predetermined target number of noise estimates using all of the source digital images calculating additional noise estimates corresponding to numerical sub-intervals which collected fewer than the target sub-interval number of noise estimates.

8. The method of claim 1 wherein the source digital images have pixels corresponding to different colors and step c) includes calculating the noise characteristic values as a function of the color of the source digital image pixels.

9. The method of claim 1 wherein the source digital images have pixels corresponding to different colors and step c) includes calculating the noise characteristic values as a function of the color and the numerical values of the source digital image pixels.

10. The method of claim 1 wherein the noise characteristic value is a function of the standard deviation of the noise present in the source digital images.

11. The method of claim 1 wherein step d) includes:

i) using a residual spatial filter to calculate pixel values for a residual digital image for each source digital image;

ii) using the pixel values of the residual digital images to generate a residual histogram; and iii) using the residual histogram to calculate the noise characteristic value.

12. The method of claim 11 wherein the source digital images have pixels corresponding to different colors and step d) includes the step of generating the residual histograms as a function of the color and the numerical values of the received source digital image pixels and calculating the corresponding noise characteristic values as a function of the color and the numerical values of the source digital image pixels.

13. The method of claim 1 wherein the source digital images are received from a single image capture device including a digital camera, a photographic film scanner or a print scanner.

14. The method of claim 13 wherein all of the source digital images are derived from the same photographic film type.

15. The method of claim 1 wherein all of the source digital images are derived from the same consumer.

16. The method of claim 1 further including the step of using the noise characteristic value to enhance the appearance one or more of the source digital images.

17. The method of claim 1 further including the step of using the noise characteristic value to control the behavior of a spatial filter to enhance the appearance one or more of the source digital images.

18. A computer storage medium having instructions stored therein for causing a computer to perform the method of claim 1.

* * * * *